(12) United States Patent
Schmitz

(10) Patent No.: US 11,390,009 B2
(45) Date of Patent: Jul. 19, 2022

(54) METHOD FOR THE ONLINE MONITORING OF FILM QUALITY AND FILM MACHINE COMPRISING A DEVICE FOR THE ONLINE MONITORING OF FILM QUALITY

(71) Applicant: Windmöller & Hölscher KG, Lengerich (DE)

(72) Inventor: Torsten Schmitz, Greven (DE)

(73) Assignee: Windmöller & Hölscher KG, Lengerich (DE)

( * ) Notice: Subject to any disclaimer, the term of this patent is extended or adjusted under 35 U.S.C. 154(b) by 526 days.

(21) Appl. No.: 15/735,562

(22) PCT Filed: Jun. 6, 2016

(86) PCT No.: PCT/EP2016/062810
§ 371 (c)(1),
(2) Date: Dec. 11, 2017

(87) PCT Pub. No.: WO2016/198359
PCT Pub. Date: Dec. 15, 2016

(65) Prior Publication Data
US 2018/0354183 A1    Dec. 13, 2018

(30) Foreign Application Priority Data

Jun. 10, 2015  (DE) .................... 10 2015 109 219.0

(51) Int. Cl.
*B29C 48/92* (2019.01)
*B29C 48/00* (2019.01)
(Continued)

(52) U.S. Cl.
CPC .......... *B29C 48/92* (2019.02); *B29C 48/0018* (2019.02); *B29C 48/08* (2019.02);
(Continued)

(58) Field of Classification Search
CPC ................................ B29C 48/92; B29C 55/28
See application file for complete search history.

(56) References Cited

U.S. PATENT DOCUMENTS 4,101,614 A * 7/1978 Havens .................... B29C 48/92
264/40.6
5,384,080 A * 1/1995 Feistkorn .............. B29C 55/065
264/40.6
(Continued)

FOREIGN PATENT DOCUMENTS

CA    2073285  A1    7/1992
EP    0 006 10 A2    3/1979
(Continued)

OTHER PUBLICATIONS

China Office Action, dated Jul. 16, 2019 for corresponding China Patent Application 201680033120.9.
(Continued)

*Primary Examiner* — Michael M. Robinson
(74) *Attorney, Agent, or Firm* — Intellectual Property Law Group LLP

(57) ABSTRACT

The invention relates to a method for the online monitoring of film quality during a production process for a plastic film, in particular a blown film or a continuously cast film, in which method the film material (1) is fed out of an outlet device (40) that is designed as a melt lug (4) by a transport device (10). The film material (1) cools on or in front of the transport device (10) and the film material (1) solidifies in front of or on the transport device (10).

17 Claims, 5 Drawing Sheets

(51) Int. Cl.
  *B29C 48/88* (2019.01)
  *B29C 48/08* (2019.01)
  *B29C 48/35* (2019.01)
  *B29C 55/28* (2006.01)
  *B29C 48/10* (2019.01)
  *B29C 55/02* (2006.01)
  *B29L 7/00* (2006.01)
  *B29C 48/305* (2019.01)

(52) U.S. Cl.
  CPC ............ *B29C 48/35* (2019.02); *B29C 48/914* (2019.02); *B29C 55/28* (2013.01); *B29C 48/10* (2019.02); *B29C 48/305* (2019.02); *B29C 55/02* (2013.01); *B29C 2948/92076* (2019.02); *B29C 2948/92209* (2019.02); *B29C 2948/92219* (2019.02); *B29C 2948/92428* (2019.02); *B29C 2948/92447* (2019.02); *B29C 2948/92571* (2019.02); *B29C 2948/92923* (2019.02); *B29C 2948/92942* (2019.02); *B29L 2007/00* (2013.01)

(56) References Cited

U.S. PATENT DOCUMENTS

| | | | |
|---|---|---|---|
| 6,875,384 B1* | 4/2005 | Whitney | B29C 45/80 264/40.5 |
| 2014/0272305 A1 | 9/2014 | Helmy et al. | |

FOREIGN PATENT DOCUMENTS

| | | |
|---|---|---|
| EP | 0 006 110 A2 | 1/1980 |
| EP | 0 516 992 A1 | 12/1992 |
| EP | 0 522 278 A1 | 1/1993 |
| EP | 1 616 687 A1 | 1/2006 |
| EP | 1616687 A1 * | 1/2006 |
| JP | H11 192660 A | 7/1999 |

OTHER PUBLICATIONS

International Search Report, dated Sep. 14, 2016 for corresponding International Application No. PCT/EP2016/062810 with English Translation.

Written Opinion of the ISA, dated Sep. 14, 2016 for corresponding International Application No. PCT/ EP2016/062810.

China Office Action, dated Mar. 16, 2020 for corresponding China Patent Application 201680033120.9 with English translation (13 pages).

Written Opinion, dated Sep. 14, 2016, for corresponding International Application No. PCT/EP2016/062810 with English translation.

International Preliminary Report on Patentability, dated Aug. 21, 2017, for corresponding International Application No. PCT/EP2016/062810 with English translation.

Alois Körber, Analysis and Optimization of the Molecular Orientation Angle of Biaxially Stretched Poly(ethylene terephthalate) Film Webs, 2014 (PhD Thesis), https://mediatum.ub.tum.de/1167050.

China Office Action, dated Jan. 26, 2021 for corresponding China Patent Application No. 201680033120.9 with English translation (total of 30 pages).

Xinyuan Shen, et al., Principles of Polymer Material Processing, China Textile Publisher, 1 st print, Jul. 2000, pp. 333-335, Jul. 31, 2000 with English language version of search report and office action in counterpart China application No. 201680033120.9 indicating degree of relevance found by the China Patent Office, see "A" indication on the search report and pp. 6, 12, 14 and 15 in the English version office action (total of 24 pages).

European Office Action, dated Jul. 7, 2020 for corresponding European Patent Application No. 16 731 817.9 with English translation summary (7 pages).

European Office Action, dated Mar. 16, 2022 for corresponding European Patent Application No. 16 731 817.9 with English translation (5 pages).

* cited by examiner

METHOD FOR THE ONLINE MONITORING OF FILM QUALITY AND FILM MACHINE COMPRISING A DEVICE FOR THE ONLINE MONITORING OF FILM QUALITY

CROSS-REFERENCE TO RELATED APPLICATIONS

This application is a U.S. National Phase application, under 35 U.S.C. § 371, of International Application no. PCT/EP2016/062810, with an international filing date of Jun. 6, 2016, and claims benefit of German Application no. 10 2015 109 219.0 filed on Jun. 10, 2015, which are hereby incorporated by reference for all purposes.

BACKGROUND OF THE INVENTION

1. Field of the Invention

The invention relates to a method for online monitoring of a film quality during a manufacturing process of a plastic film and a film machine with a device for the online monitoring of the film quality during a manufacturing process of a plastic film.

2. Background

From the state of the art it is known that in a manufacturing process of a plastic film free flowing film material is arranged on a transport device via an outlet device, particularly a casting roller through a longitudinal outlet gap. The transport device is normally cooled such that during the rotation and/or movement of the transport device the film material is cooled. During cooling the film material undergoes a temperature profile and to a certain paint in time drops below its own solidifying temperature such that a solidification starts. At the acceptance point for the film material the transport device the film material has to be completely solidified to the film web.

It has turned out that said manufacturing process, particularly the manufacturing process for plastic film is only stable when the quality feature expression of the tubal produced film only scatter randomly and when the expression is only moved within limits. In this case it is called a capable process. Among others the mechanic properties of the plastic film are a main quality feature. For monitoring the mechanic properties it is known from the state of the art to perform an offline quality control which means that laboratory tests are performed in defined intervals during the approaching of the film machine and/or during the manufacturing process. Thereby, a sample of the produced film is taken and subsequently a corresponding material testing is performed in the laboratory. Therewith, the adjustment phase for the production of the film and the quality control is ensured. The respective sample taking and the elaborate adjustment process and the monitoring of the quality during the manufacturing process lead however to a reduced overall quality of the film, to a high effort regarding sample taking and nonetheless to a high waste material or a high amount of so called refurbished products.

SUMMARY OF THE INVENTION

It is the object of the present invention to at least partially prevent the previously described disadvantages. Particularly, it is the object of the present invention to improve the quality of the film in a cost-efficient and simple manner, particularly to reduce the waste.

The previous object is solved by a method with all features of claim 1 and a film machine with all features of claim 19. Additional features and details of the invention result from the depended claims, the description and the drawings. Thereby, features and details which are described in relation to the method according to the invention naturally also apply in relation to the film machine according to the invention and vice versa such that regarding the disclosure of the single aspects of the invention it can always be reciprocally related to.

The method according to the invention serves for online monitoring of a film quality with a manufacturing process of a plastic film, particularly a blowing film or a cast film. With the method according to the invention a film material is led out or pulled out of the outlet device in form of a melt strip through or via a transport device, wherein the film material is cooled on or before the transport device. The transport device can, for example, be a cast roll/chill roll to produce a cast film. Likewise, it is possible to integrate the method in a blow film machine with which the transport device pulls the film material out of the outlet device.

Hereby, the transport device can be configured such that after a certain time the film material solidifies on the transport device or before the transport device. For example, the solidified film material can be removed from the transport device at the place of deduction. The method according to the invention intents according to the invention that a determination of a position of a frost line occurs with which the film material is solidified at the transport device when for example a cast film is produced or before the transport device when a blow film is produced. Likewise, a measurement of at least one process parameter of the solidifying film material occurs in the vicinity of the frost line. This means that the measurement of said parameter can occur before or at or after the frost line. The film comprises a transport direction during the online monitoring which is for example determined by rotation of the cast roll or in case of the blow film which is oriented to the transport device, wherein in said example the transport device pulls the film material upwards in contrast to the blow head of a blow film machine.

The method according to the invention calculates a relaxation parameter which is taken into account for the relaxation of the molecule orientation of the film material. The method according to the invention subsequently verifies in how far the at least one relaxation parameter is within the process limits. This is a decision criterion during the online monitoring regarding the film quality.

According to the invention it has turned out that the diverse requirements to the to be produced plastic films, particularly blown films, cast films etc. can be reduced on the mechanic film properties which are relevant for the cohesion of the products/loads. The mechanical properties are determined among others by the recipe and the process control, particularly here the orientation of the film melt, the relaxation of the molecular orientation and the crystallisation to the setting point (frost line) are involved. Tests have revealed that via the characteristic value "relaxation" good quality statements can be made regarding the to be produced film. It is particularly advantageous that with the method according to the invention the relaxation of the film material is taken into consideration along the whole transport line in the transport direction during the online monitoring method, wherein the transport line extends at least from the outer device to the frost line. It is particularly an advantage that by the usage of measured process parameters according to step b) a relative relaxation of the solidified film can be generated, wherein in the most simple case the relative relaxation in transport direction of the film material is calculated as follows:

$$O = A - (Rsf + Rcr), \text{ wherein}$$

A=orientation level incorporated by the draw off ratio
Rsf=relaxation (of the orientation) appearing in the melt strip
Rcr=relaxation (of the orientation) appearing before or on the transport device.

It has been shown that the approach may be an advantage that it enables to take further relevant influencing factors into account qualitatively, also quantitatively. It has been shown that in the draw off ratio an initial orientation of film material can be rediscovered that the pulling of the melt from the "thickness" of the nozzle gap of the outer device which can be between 0.2 mm and 1 mm, particularly 0.6 mm to 1 mm up to the film thickness is taken into account, wherein the film thickness can amount in an area for example between 2 μm and 80 μm, particularly between approximately 6 μm and 35 μm.

Advantageously, in the relaxation parameter the following components are taken into account:
- the nominal relaxation time of the recipe optionally assembled from the nominal relaxation time and the single raw materials
- the residence time in the respective area
- the temperature during the residence time in the melt meaning via a suitable description of the strong temperature dependency of the normal relaxation time.

Advantageously, by the procedure the line speed and the temperature level can be represented and the specific behaviour of a recipe or single recipe components.

Advantageously, the measurement of said process parameters occurs at the frost line. A different measurement meaning before or after the frost line can likewise occur. For example the measurement with approximately 70% of the transport line between the outlet device to the frost line can be sufficient. Likewise, a measurement with 80% or 90% or 110% or 130% is possible, wherein the two last values define a measurement after the frost line.

Advantageously, with a method according to the invention the strong temperature dependent relaxation is taken into account, wherein the length from hitting the film melt to the transport device up to the reaching of the frost line (solidification) can be separated in a suitable amount of segments and to each segment a residence time and a nominal relaxation time can be assigned. Thus, the relaxation particularly the relaxation parameter of the film material in transport direction can be simulated or mapped.

It is particularly an advantage that particularly plastic films like collation shrink (blow film), shrink hood (blow film), stretch hood (blow film) or stretch film (cast film or blow film) can be analysed according to the online monitoring method according to the invention.

A frost line is within the sense of the present invention a section in the transport direction or on the transport device, particularly in the film material, in which the solidifying process occurs. Thus, starting from a certain melting temperature, which is particularly in the vicinity of the solidifying temperature of the film material, the crystalline structure of the film material changes and the whole film material hardens and therewith solidifies. Subsequently, in the further course of the contact length of the film material in transport direction or on the transport direction the film web is solidified and not further free flowing, but in a rigid state. This transition region is defined as a frost line.

According to the invention it can be intended that the determination of the position of the frost line according to step a) occurs at least partially by a temperature determination of the film material. The temperature determination can thereby occur in a contacting manner or contactless for example with the help of infrared measurement. Hereby, one or multiple sensors are possible which are used for the temperature determination. Likewise it is possible according to the invention that the frost line is determined in another manner, for example by ultrasound monitoring. This is particularly an advantage regarding the contactless determination possibilities. Thus, from transmission, absorption and/or reflection of the ultrasound radiation a corresponding yoke can be drawn to the frost line. This contactless and fast determination thereby detects particularly the to be established crystalline structure in the solidifying process of the film material. Naturally, the determination of the frost line is freely combinable with the determination possibilities described in this invention, for example in order to achieve a higher speed or a higher accuracy of the determination of the frost line. For example it can be an advantage when with the method according to the invention the determination of the frost line is performed at least partially by a labelling device, particularly a labelling roller, wherein geometric labels are introduced in the solidification of the film material. Thus, for example by a labelling roller a mechanic influence on the film material can occur. In case the film material is still in a free flowing state, is the film material still previous to the frost line, thus this mechanic deterioration will leave geometric marks in the film material. In this position of the marking device the film material is still free flowable before the frost line and it however the labelling device does not leave visible marks, thus it can be concluded that at this position of the labelling device the film material is already sufficiently cooled down. This position is behind the frost line. With this method preferably in iterative manner a localisation of the frost line can occur. Thereby, preferably the combination with a camera is provided which is able to support the user and fully automatically recognize the geometric labels. Particularly, for an iteration possibility such a labelling device is arranged in transport direction of the transport device or in transport direction moveable to the transport device.

The transport device can for example be a cast roll or a chill roll. The transport device is advantageously configured cylinder-like, wherein it is pivotably mounted about an axis of rotation. This transport device rotates during the whole proceedings for the corresponding transport and the cooling of the film material arranged on the surface. The determination of the frost line extends preferably likewise at least via a section of this axial direction transverse to the conveyance direction/transport direction of the film material. Preferably, a frost line is determined punctual or even continuously over the whole length of the axial extension of the cast roll or the chill roll. Therewith, it is possible to recognize additional disadvantages and to prevent quality deficiencies.

Further, the invention can comprise that multiple measurement points are provided in order to measure process parameters. The quality of the online monitoring can be improved such that multiple measurement points are integrated within the method in order to measure at least one process parameter which is relevant for the determination of the relaxation parameter. Advantageously, multiple measurement points are in axial direction transverse to the transport device of the film material such that over the width of the film material the process parameters are measured. For each measurement point preferably a relaxation parameter can be calculated such that at different widths of the film material traverse to the transport direction an online monitoring is performed.

Further, the invention can comprise that measurement points for measuring of process parameters are provided which are arranged transverse to the frost line and/or transverse to the transport direction of the film material determined by the transport device. For the measurement of the process parameter a measuring unit can be provided which measures the film width transverse to the transport direction of the film material of multiple process parameters. For example, the measurement unit can comprise multiple sensors which measure the process parameter at the respective measurement points respectively. Alternatively, it is possible within the scope of the invention that the measuring unit is configured traversing over the width of the film material. With the traversing measuring unit it can be realized according to the invention that via the whole width of the film material process parameters are determined which are used for the calculation of the relaxation parameter.

Advantageously for each measurement point a relative relaxation parameter is calculated in order to achieve an online monitoring of the film quality via the width of the film.

According to the invention the process parameter can be the temperature of the film material. Since the relaxation is highly temperature independent it is an advantage to measure the temperature of the film material as a process parameter. Subsequently, the relaxation parameter, particularly the relative relaxation can be calculated for each measurement point wherein according to the invention a plurality of relaxations for the relaxation parameter and/or the relative relaxation parameter can be taken into account, wherein particularly the relaxations starting with the relaxation from the melt strip in transport direction to the frost line and/or until shortly before or after the frost line in the relaxation parameter, particularly in the relative relaxation parameter is taken into account. The process model integrated into the method according to the invention determines a statement about the relative relaxation parameter of the solidified film, based on this a statement about the quality of the just produced film can be made.

In a method according to the invention according to step c) the relaxation parameter can be at least dependent on the position of the frost line and the at least one process parameter. Further, the method according to the invention can comprise that according to step c) to each measurement point a relaxation parameter is determined, wherein in step d) the single relaxation parameters are put into correlation to the process limits, for example it is possible that initially the position of the frost line is determined along the film width, wherein the position subsequently is deposited or saved with a method according to the invention. Using the frost line position and further measured process parameters or previously entered process parameters the relaxation parameter, particularly the relative relaxation parameter can be represented as a trend function over time. Additionally it is possible that the possible change over time of the frost line position is determined via a continuous measurement of the film temperature just behind the frost line. A "geometric" alteration of the frost line over the width can be determined via the measurement unit. Since in step d) the single relative relaxation parameters are brought into correlation to the process limits it can be visualized for the user of the film machine in a very fast and simple manner, when the relative relaxation parameters of the respective measurement point, meaning which are spread over the film width, are sufficiently constant and/or almost the same size over a defined time. This can for example be defined via setup limits which serve for a statement during monitoring, in how far a constancy of the relaxation parameter exists and/or the relative relaxation parameters are among another with undefined limits.

The method according to the invention can provide that before the actual production process of the plastic film is started the setup process is performed until the relaxation parameters are within the setup limits, particularly when the end of the setup process is reached, process data are saved from process parameters. The process data can for example be the melting temperature, the transport speed of the film material, particularly the speed of the cast roller, the mass flow of the melt, the vacuum at the melting process, etc. Therewith a "fingerprint" all process data of the film product can be saved. Likewise it is possible that after the setup process a matching with offline measured mechanic characteristic values from the laboratory occurs.

According to the invention the method can comprise that after the setup process a calibration process occurs in a defined calibration time, particularly with which the process limits are determined or are newly determined. After the setup process a process according to the invention is existent which possess for the respective customer or application possesses a sufficient constancy of the relaxation parameter, particularly the relative relaxation parameter over the time and film width. As soon as the process data of the process parameters, particularly the recipe are saved by the user, a previously defined calibration process can be started in which the method takes up and calculates all relevant process parameters, particularly the relevant relaxation parameter via the film width and time. With the calibration process new process limits are determined or newly determined, wherein the process limits can be relaxation limits. For example, it is possible that after the expiry of the calibration time which can be for example multiple minutes, for example 5 minutes<time<80 minutes or 1 hour<time<5 hours, a mean value, a minimum and a maximum relative relaxation can be determined and subsequently all newly determined values can be put into relationship to this value. Starting from this point of time a trend function for the online monitoring emerges which is assembled from the relation from O (currently) to O middle (mean value). As long as the relation is within the previously determined limits minimum and maximum relative relaxations all produced films can be determined by the method according to the invention as good films. In case said limits are damaged it is possible that the method according to the invention recognizes these films as bad films.

Further, it is possible that said film is initially recognized as a film which damages such limits. In this point the method according to the invention enables that the film is monitored in an offline method in a laboratory. In case a good quality is reported back from the laboratory it is possible that the process limits are altered, particularly the area between the process limits is increased. The alteration of the process limits can occur automatically or manually by the user of the film machine.

Likewise, it is possible that during the calibration process all process parameters are calibrated which determine the production process and/or are relevant for the production process. This means that among others the melting temperature, the transport speed, particularly the speed of the chill rolls, the mass stream of the melt, the vacuum at the melt process etc. are calibrated. This means that for example a calibration occurs with which a mean value, a minimum and a maximum value are determined. Therewith, detailed process limits of the process parameter can be determined during the calibration process. According to the invention the method comprises that in case the relaxation parameter particularly the relative relaxation parameter is outside the process limits it is determined if a process parameter is outside its detailed process limits. Therewith, it is possible that by the use of calibrated process parameters with the exceeding of the process limits with the relaxation parameter a hint is given to the user or the method which of the detailed limits has led to an exceeding of the process limits. This means that at least one of the detailed process limits can be damaged which could have a damage of the process limits in relation to the relaxation parameter. The method according to the invention can include a control and/or regulation such that it doesn't lead to a damage of the process limits.

Further, the invention can provide a method according to the invention with which via a display unit the relaxation parameter and/or the process limits and/or the detailed process limits and/or the setup limits and/or the process parameter are displayed and/or can be altered. Further, it is possible that the production process occurs already during the calibration process. Hereby, a high efficiency in the producing process of the plastic film is achieved. By the display unit the user of the film machine receives current information of the film quality which is produced to this point of time and can immediately interact in case said process limits are damaged. An advantage of the method according to the invention is that this has the opportunity to be self learning. For example via offline measured characteristic values from the laboratory this process limits can be altered.

In a further measure improving invention it is possible that an analysis of the mechanic properties of the film can occur offline, for example by using a highlight test. The measured values can for example be correlated with the online determined relaxation parameter, particularly the maximum stretch and the force with a determined stretch, for example 70% of the maximum stretch. Therefore, a regress function can be fed with the introduced data and a correlation date can be determined. Starting from a certain correlation date a switching of the trend function to a predicted stretch or force is possible. In the further embodiment of the invention a direct coupling with the offline test can occur such that via the input of the respective roll characteristics at which the produced film material is located a direct assignment and transfer of the values can occur.

Further, the method according to the invention comprises that all process data of the process parameters and relaxation parameters related to the respective film material which is on a roll can be saved and/or further transferred, particularly to a winding robot in order to supply the winding robot with the existing and determined stretch possibility of the currently used film such that preferably always exactly the correct holding force is exactly insertable by the corresponding variation of the corresponding stretch dependent from the associated stretch possibility of the film of the winding robot.

Likewise, subject of the present invention is a film machine with a device for the online monitoring of the film quality with the production process of a plastic film. With this film machine a film material from an outlet device in form of a melt strip is transferable through a transport device or can be removed in order to cool the film material before or at the transport device until the fill material solidifies. The film machine comprises at least one measuring unit for the determination of the position of the frost line with which the film material solidifies and for measuring of at least one in the vicinity of the frost line existing process parameters of the solidifying film material. The measurement of the process parameter can occur before or at or after the frost line. Further, the film machine according to the invention comprises at least one analyzing unit for the calculation of at least one relaxation parameter which takes the relaxation of the molecular orientation of the film material into account, wherein the evaluation unit further controls in how far the at least one relaxation parameter is within the process limits. The relaxation parameter is preferably an amount of values of calculated relaxations, particularly relative relaxations via the film width and the time, particularly from the melt strip to the frost line of the film material. The film machine provides the same advantages like they are described in detail related to the method according to the invention.

BRIEF DESCRIPTION OF THE DRAWINGS

Further advantages, features and details of the invention result from the subsequent description in which embodiments of the invention are described in detail in relation to the drawings. Thereby, the features described in the claims and in the description can be each single for themselves or in any combination essential for the invention. It is shown schematically:

DETAILED DESCRIPTION OF SPECIFIC EMBODIMENTS

Figure 1:
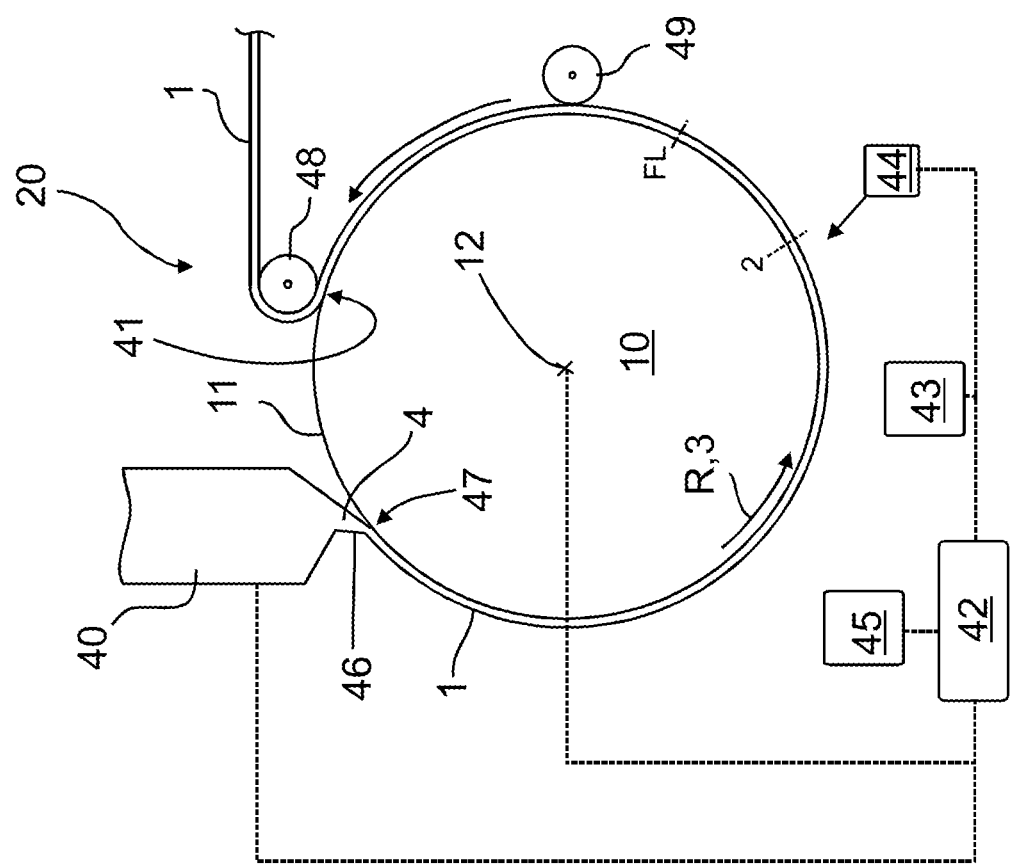
FIG. 1 an embodiment of a film machine according to the invention.

FIG. 1 schematically shows a film machine 20 or a cast film machine which comprises a transport device 10 which is rotatably mounted. The transport device 10 is a chill roll 10. Via an outlet device 40, to which one or multiple extruder devices are upstreamed, free flowable film material 1 is arranged via the outlet gap 46 to the surface 11 of the chill roll 10. The chill roll 10 is thereby configured cooled such that over the contact length a cooling rate and therewith a cooling down of the film material 1 is provided. At the place of deduction 41 which together with the pick-up location 47 results in an angle of deflection a now the solidified film material 1 is lifted from the chill roll 10 via a tear-off roller 48.

According to FIG. 1 it is for example possible that a cleaning roll 49 contacts the film material 1. This contacting serves to discharge the corresponding waste. The cleaning roll 49 is configured with a not explicitly shown adjusting mechanism which comprises a circumferential displacement about the chill roll 10 and a radial displacement to the chill roll axis 12. The film material 1 leaves the outlet device 40 in form of a melt strip 4. In transport direction R of the transport device 10 the film material 1 cools down until it solidifies at a frost line FL. The determination of the frost line FL occurs via temperature determination of the film material 1 according to shown embodiment.

For the determination of the quality during the online monitoring in the film machine a relative relaxation parameter is used the characteristic value which provides a statement about the relative molecule orientation of the frozen film for the method according to the invention. The relative relaxation is temperature dependent wherein the circumferential angle is separated in a suitable number of segments from the hitting of the melt strip 4 on the chill roll 10 to the reaching of the frost line FL and each segment is assigned to a resting time and a nominal relaxation time. Thus a relative relaxation parameter can be configured and/or calculated on the chill roll 10 which occurs via a process model.

In order to determine the frost line FL multiple measurement points along the width of the film material 1 can be taken into account.

Figure 2:
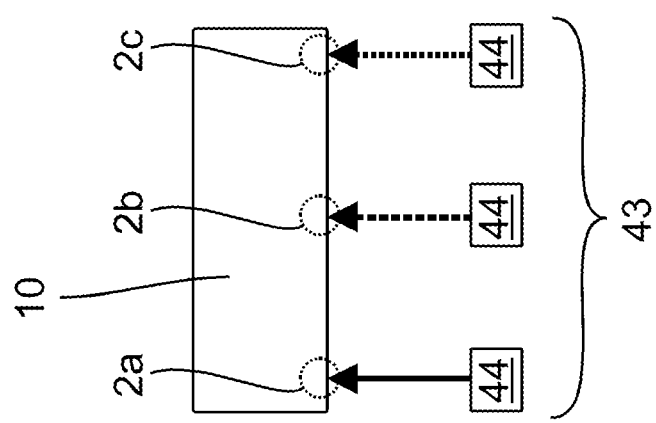
FIG. 2 an embodiment for the online monitoring of a film quality with the production process of a plastic film according to FIG. 1, FIG. 3 a possible embodiment for the monitoring and determination when a setup process for the film machine is achieved, FIG. 4 a further embodiment for the monitoring when process limits are met or exceeded during the production process of a plastic film, FIG. 5 an embodiment for the establishment of a correlation good during the production process of a plastic film and FIG. 6 a possibility for the online monitoring of a film quality in the film machine, wherein instead of the whole film width the width of the single film notes is taken into account.

The shown embodiment discloses that multiple relative relaxation parameters are calculated which are related to different widths positions of the film material 1. According to FIG. 2 it is shown that multiple measurement points 2 are existent at the chill roll 10 in order to measure a process parameter P traverse to the frost line FL, particularly the temperature of the film material 1. Subsequently the calculation of the relative relaxation parameter occurs via the process model of the method according to the invention.

Figure 3:
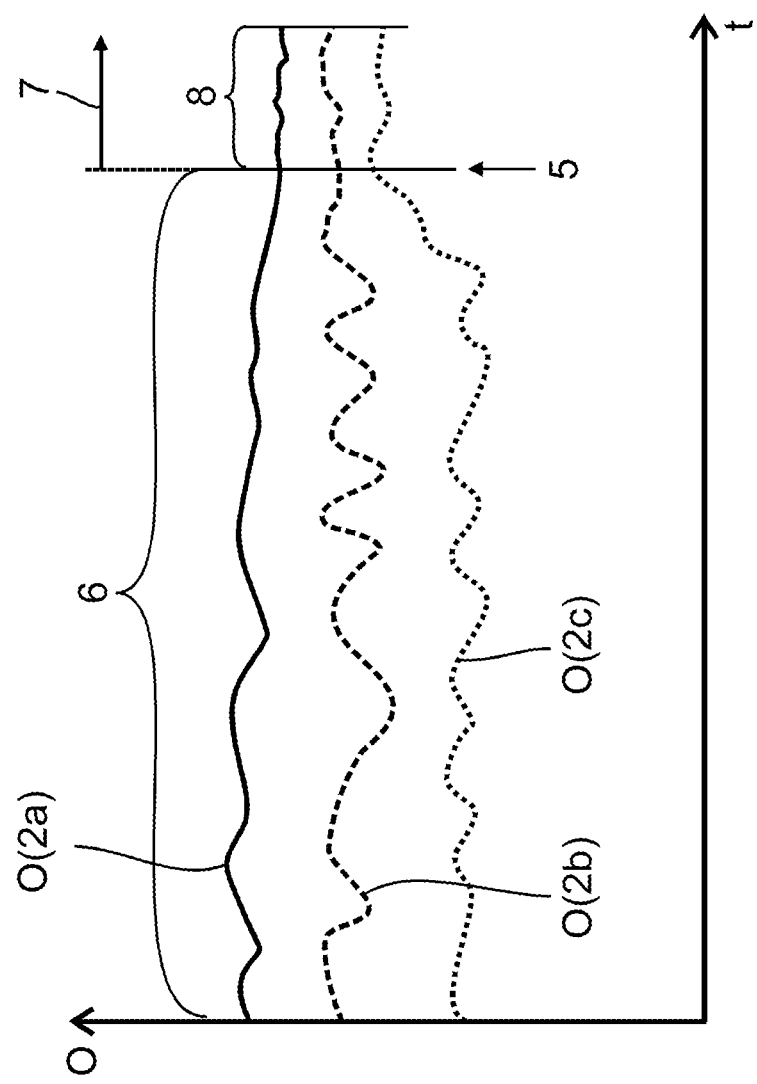

In FIG. 3 it is schematically shown how a setup process of the method according to the invention can proceed timely related to three different relative relaxation parameters. Using the frost line position which is previously determined according to FIG. 1 and the further entered parameter or parameter provided by the method according to the invention the relative relaxation parameter is calculated and shown as a trend function over time which is shown in FIG. 3 in three different measurement positions 2. The representation of the trend function in this manner enables the user or the method of the film machine according to invention to start a constant process point very fast and simple which has the reference sign 5 in FIG. 3. Previous to starting the actual production process of the plastic film the setup process 6 is performed until the relative relaxation parameters are in between the setup limits E. The setup limits E can for example be that the relative relaxation parameter over the film width and also over time is sufficiently constant and/or is within the defined setup limits. Likewise, it is possible that a comparison of offline measured mechanical characteristic value from the laboratory is performed such that the end of the setup process 6 all process data of the process parameters regarding the production process of the plastic film are saved.

Subsequent to the setup process 6 the actual production process 7 can be started.

According to the invention after the setup process 6 a calibration process 8 occurs in a defined calibration time which is likewise shown schematically in FIG. 3. In this calibration time new process limits G are determined which is described in FIG. 4.

Figure 4:
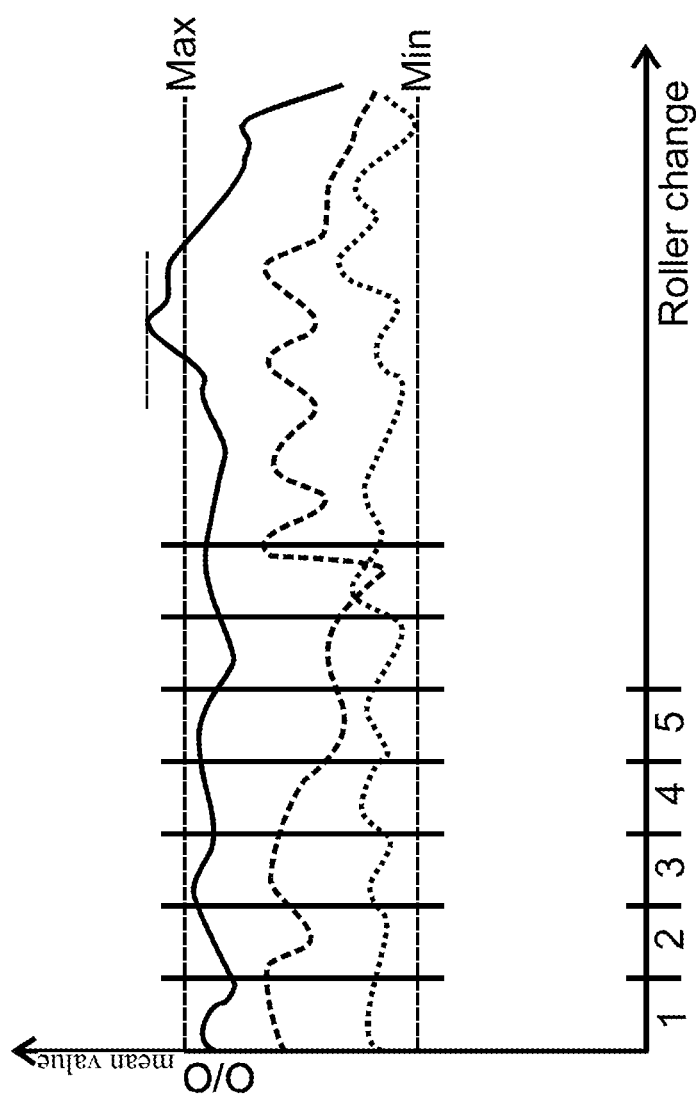

At the expiration of the calibration time a mean value, a minimum and a maximum relative relaxation parameter over the width of the film material and time is determined and subsequently all new determined values are put in relation to this value. In FIG. 4 the relation from the relative relaxation parameter O to $O_{meanvalue}$ are shown and the single roller changes of the film material 1 which is produced. Further, the representation according to FIG. 4 comprises the process limits Max. and Min. which are determined by the calibration process 8. Over the measurement of the temperature at the different measurement points 2 according to FIG. 4 now exemplary three trend functions are shown in FIG. 4. In case the trend functions are within the process limits the film material 1 is a good product in relation to the respective roller change. In case the process limits are damaged either above or below the quality of the film material 1 is identified by the method as a mal product. The method according to the invention can however be interpreted that it is further improved as self-learning. This means that with a mal product the specific roller change offline can be monitored regarding its mechanic properties. In case the result of the probe shows that a good quality is existent the process limits can be broadened such that the process window according to FIG. 4 is enlarged by displacement of the limits.

Figure 5:
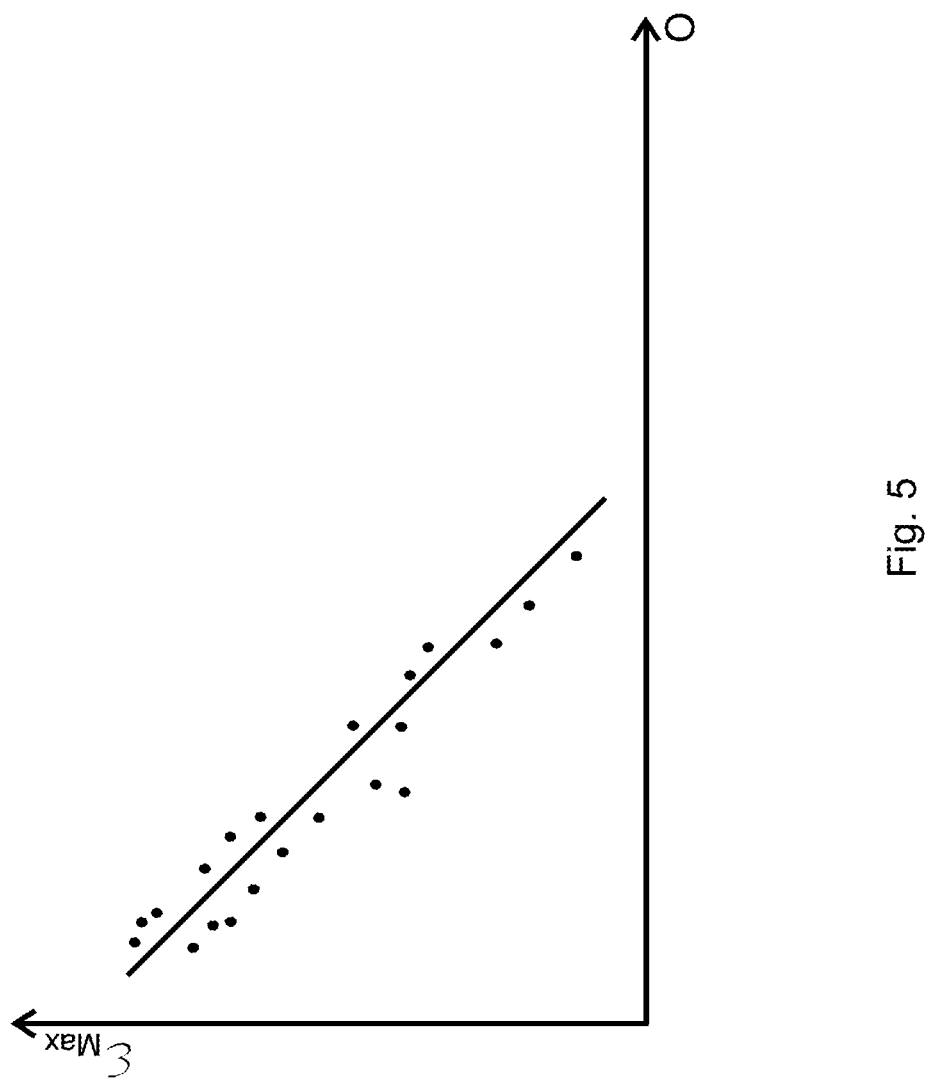

As far an analysis of the mechanical properties occurs the measured values can be correlated with the online determined relative relaxation parameters which can for example occur via a regress function according to FIG. 5. The regress function is supplied with inserted data and the correlation quality can be determined. Starting from a certain correlation quality the switching of the trend graphic to a for example predicted stretching or force is possible. In a further state of extension of the method according to the invention a direct coupling with the offline test can occur such that via the input of the respective roller characteristics on which the tube produced film is arranged a direct assembly and transfer of the values can occur.

Figure 6:
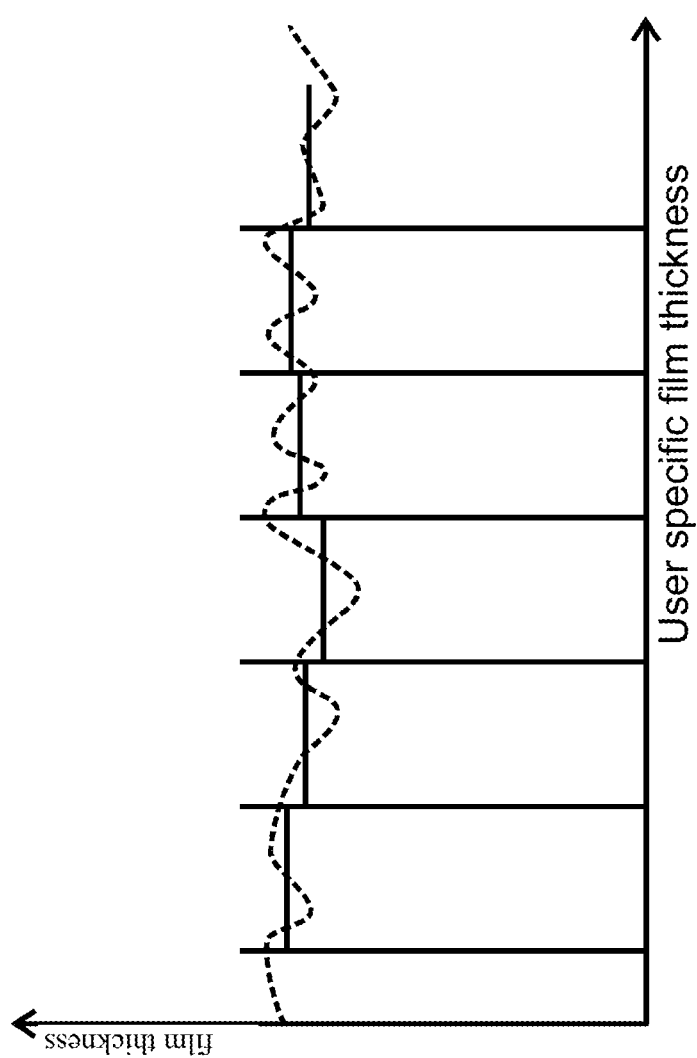

In FIG. 6 a further embodiment according to the invention is shown with which a film thickness of the whole film material width in correlation to the user specific film thickness is shown. Hereby, the method according to the invention for the online monitoring of a film quality can be taken into account such that only the user specific width is taken into account with the survey, in how far the relative relaxation parameters are within the process limits. This has the advantage that for example certain users of a plastic film overall width can be determined as a good product although, over the plastic film over all width one or multiple uses can result which are for example mal products.

The method according to the invention can likewise comprise that during the calibration process 8 further process parameters are calibrated wherein detailed process limits of the process parameters are determined during the calibration process. In case a process parameter according to FIG. 4 is damaged regarding the relative relaxation parameter, via a damage of the detailed process limit or limit a hint can be given for the method or to the user which has led the process parameter to an exceeding of the detailed process limits. This or these process parameters can be corrected for example via a regulating or control unit. Likewise the user can manually correct the process parameter within the detailed processor limits.

The shown embodiments can also be related to a not explicitly shown blow film machine with which the film material 1 is sucked from the blow head, which is the outlet device 40 according to the invention from the spaced apart transport device 10. Normally, the transport device 10 is arranged above the blow head wherein the film material is cooled down via a lateral air stream and is displaced in a transport direction R to the transport device 10. Hereby, the film material 1 proceeds through a transport distance from the outlet device 40 to the frost line FL like shown in the embodiments. The shown method for the online monitoring according to FIGS. 1 to 6 can be further related to the blow film machine. A difference is that the film material from the transport device is cooled down previous to the transport device or is solidified previous to the transport device.

REFERENCE LIST

1 Film material
2 Monitoring point
3 Transport direction
4 Melt strip
5 Process point
6 Setup process
7 Production process
8 Calibration procedure
10 Transport device, chill roll
11 Surface
12 Axis
20 Film machine
40 Outlet device
41 Place of deduction
42 Evaluation unit
43 Measuring unit
44 Sensors
45 Display device
46 Outlet gap
47 Pick-up location
48 Tear-off roller
49 Cleaning roller

What is claimed is:

1. A method for online monitoring of a film quality within a production process of a plastic film, wherein:
   a film material is led from an outlet device in a form of a melt strip by a transport device, wherein the film material is cooled on or before the transport device,
   the film material is solidified before or on the transport device,
   comprising the following steps:
   a) determination of a position of a frost line, via a film machine measuring unit, with which the film material is solidified before or on the transport device,
   b) measuring of at least one process parameter of the solidifying film material in a vicinity of the frost line via the film machine measuring unit, wherein the vicinity includes up to the frost line, at the frost line and after the frost line,
   c) calculation of at least one relaxation parameter, via a film machine evaluation unit, which takes a relaxation of a molecular orientation of the film material into account,
   d) monitoring in how far the at least one relaxation parameter is within process limits of the at least one relaxation parameter, via the film machine evaluation unit,
   wherein the method includes a controlling by a film machine control unit, such that the at least one relaxation parameter does not lead to a violation of the process limits; wherein before starting the production process of the plastic film, a setup process is performed until the at least one relaxation parameter is within setup limits determined during the setup process,
   wherein after the setup process a calibration process occurs in a defined calibration time, wherein at an expiration of the calibration time a mean value, a minimum and a maximum relaxation parameter over the width of the film material and time are determined.

2. The method according to claim 1,
wherein
the determination of the position of the frost line according to step a) occurs at least partially by a temperature determination of the film material via the film machine measuring unit which comprises multiple sensors.

3. The method according to claim 1,
wherein
multiple monitoring points are provided to the film machine measuring unit in order to measure the at least one process parameter.

4. The method according to claim 3,
wherein
the monitoring points are provided to the film machine measuring unit for measuring the at least one process parameter, the monitoring points being transverse to at least the frost line or transverse to a transport direction of the film material determined by the transport device.

5. The method according to claim 3,
wherein
according to step c) to each of the monitoring points a relaxation parameter is determined via the film machine evaluation unit, wherein in step d) each relaxation parameter is brought into correlation to the process limits via the film machine evaluation unit.

6. The method according to claim 4,
wherein
a plurality of relaxation components are taken into account for the relaxation parameter as calculated by the film machine evaluation unit.

7. The method according to claim 1,
wherein
the process parameter is a temperature of the film material as measured by the film machine measuring unit.

8. The method according to claim 1,
wherein
according to step c) the relaxation parameter is at least dependent on the position of the frost line and the at least one process parameter as measured by the film machine measuring unit.

9. The method according to claim 1, wherein
at least the relaxation parameters are calibrated or the at least one process parameter are calibrated which at least determine the production process or are relevant for the production process.

10. The method according to claim 1,
wherein with the calibration process the process limits are updated.

11. The method according to claim 1, wherein
a refinement of the process limits of the at least one process parameter are determined during a calibration process.

12. The method according to claim 11, wherein
in case the relaxation parameter is outside the process limits it is determined if the at least one process parameter is outside of the refinement of the process limits.

13. The method according to claim 12,
wherein
the process parameter is automatically or manually varied such that the process parameter is within the refinement of the process limits again.

14. The method according to claim 1, wherein
the production process occurs already during the calibration process.

15. The method according to claim 1,
wherein
the process limits are alterable via a film machine control unit.

16. The method according to claim 1,
wherein
via a display unit at least the relaxation parameter or the process limits or a refinement of the process limits or the setup limits or the at least one process parameter are at least displayed or alterable.

17. The method according to claim 15,
wherein the process limits are alterable after an offline monitoring of the film quality,
wherein an area between the process limits are enlargeable.

* * * * *